P. GALASSI
Dec. 15, 1931. Re. 18,282
COMPOSITE FLOOR STRIP
Original Filed Feb. 6, 1928 2 Sheets-Sheet 1
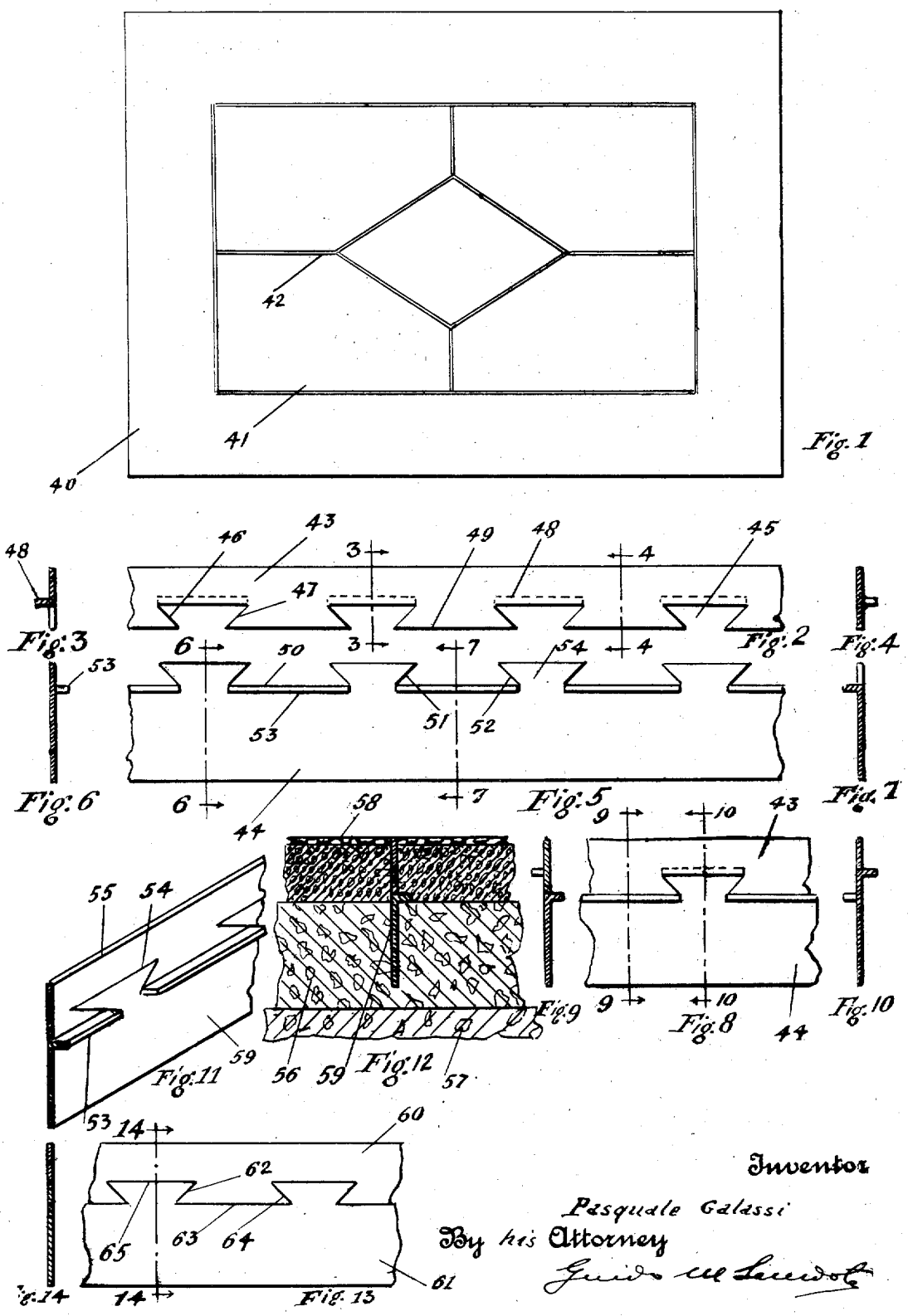
Inventor
Pasquale Galassi
By his Attorney
Guido M. Lenoble P. GALASSI
Dec. 15, 1931.
Re. 18,282
COMPOSITE FLOOR STRIP
Original Filed Feb. 6, 1928 2 Sheets-Sheet 2
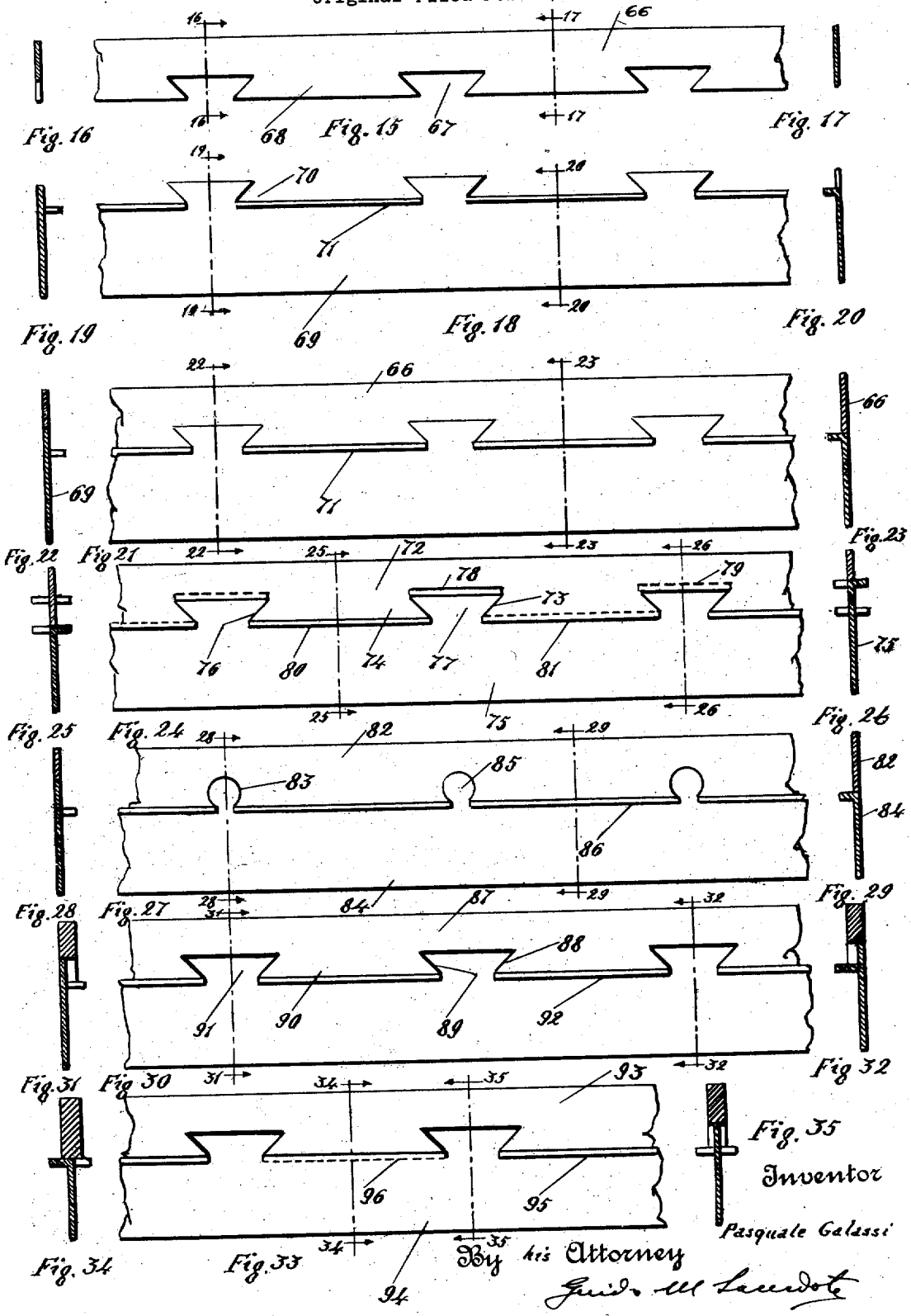
Inventor
Pasquale Galassi
By his Attorney
Guido M. Lamadot Reissued Dec. 15, 1931

Re. 18,282

UNITED STATES PATENT OFFICE

PASQUALE GALASSI, OF NEW YORK, N. Y.

COMPOSITE FLOOR STRIP

Original No. 1,718,041, dated June 18, 1929, Serial No. 252,323, filed February 6, 1928. Application for reissue filed September 17, 1931. Serial No. 563,421.

This invention relates to improvements in the construction of terrazzo and similar floorings, and more particularly refers to a new type of dividing strip adapted for use in connection with such floors.

Terrazzo, granolithic, stucco and similar floors usually comprise a lower or foundation bed made of concrete or cement or mortar or other suitable material, and an upper or finishing layer generally consisting of a mixture of marble chips and cement, by means of which a good durable surface may be obtained as well as pleasing designs and color effects of a practically unlimited variety.

The upper layer which is generally placed in position after the foundation layer has been allowed to harden to a sufficient degree of consistency, is generally divided into a number of panels or units in a predetermined arrangement, which are obtained by outlining the desired design by means of dividing strips placed on or through the foundation layer.

These strips generally consist of flat metal bars set on edge having their upper edge flush with the surface of the floor; and said bars are generally provided with anchoring and positioning means insuring a firm binding action between the strips and the materials of which the floor is composed.

These bars are generally made of relatively soft metal such as brass for instance, the wearing qualities of which are approximately equal to those of the floor itself; and according to the nature of the floor and of the design to be produced, the dividing strips may be of various thicknesses and lengths.

Relatively thin strips may readily be obtained out of sheet metal, and are suitable for floors of moderate size; however, relatively large floors, or floors composed of relatively large units, call for strips having sufficient rigidity to withstand the lateral pressure of the material without bulging when the floor is laid. These heavier strips are also generally made out of sheet metal but brass being expensive material, their use materially increases the cost of the floor. At times the ornamental features are such as to require extra thick metallic strips showing through the material, and in these cases, the cost is still higher.

Aside from their relatively high cost, heavy gauge strips also generally require more expensive operations and the use of heavier machines and dies for the production of anchoring and positioning means which are generally offset or otherwise obtained from the body of the strip itself.

In the case of extra heavy strips it becomes actually impossible to produce anchoring means by means of punch and die operations, and therefore suitable additions must be made to the strips by means of riveting or other equivalent operations, so that both the cost of material and that of labor are again materially increased.

The primary object of this invention is to provide a dividing strip for terrazzo floors and the like, of a novel and improved type, comprising two interlocking sections permitting the use of two separate metals in the production of the strip.

Another object is to provide a novel and improved dividing strip for floors of the character specified, suitable for the production of a relatively heavy lined design, yet permitting the use of a relatively light gauge rib portion, readily lending itself to punch and die operations for the production of anchoring and positioning means, adapted to retain the device in position.

A further object of the invention is to provide a defining strip of the character specified, composed of two different sections securely interlocking with one another, permitting the use of a relatively high grade metal for the top of the strip and a less expensive metal for the rib portion thereof, without materially affecting the structural resistance of the strip itself.

A further object is the provision of a dividing strip for terrazzo floors or the like having upper and lower longitudinal sections of different metal, each section consisting of a single thickness of metal, said sections being permanently connected to each other.

Other objects and advantages of the present invention will more fully appear as the description proceeds and will be set forth and claimed in the appended claims.

Various embodiments of my invention are illustrated in the accompanying drawings, in which:

Fig. 1 is a plan view of a floor illustrating the manner in which the strips are used;

Fig. 2 is a fragmentary side elevation of the upper portion of a strip embodying my invention;

Fig. 3 is a cross sectional elevation through line 3—3 of Fig. 2;

Fig. 4 is a cross section elevation through line 4—4 of Fig. 2;

Fig. 5 is a fragmentary side view in elevation of the lower portion of the same strip;

Fig. 6 is a cross sectional elevation through line 6—6 of Fig. 5;

Fig. 7 is a cross sectional elevation through line 7—7 of Fig. 5;

Fig. 8 is a fragmentary side view in elevation of the assembled strip;

Fig. 9 is a cross sectional elevation through line 9—9 of Fig. 8;

Fig. 10 is a cross sectional elevation through line 10—10 of Fig. 8;

Fig. 11 is a fragmentary view in perspective of the same strip;

Fig. 12 is a vertical cross section showing the strip illustrated in Figs. 2 to 11, in position, at the same time illustrating the function of positioning and anchoring means offset therefrom;

Fig. 13 is a fragmentary side elevation of a somewhat simpler type, of strip also embodying my invention;

Fig. 14 is a cross sectional elevation through line 14—14 of Fig. 13;

Fig. 15 is a fragmentary side elevation of a strip upper portion, similar to that used in the strip of Fig. 13;

Fig. 16 is a cross sectional elevation through line 16—16 of Fig. 15;

Fig. 17 is a cross sectional elevation through line 17—17 of Fig. 16;

Fig. 18 is a fragmentary side elevation of a lower strip portion similar to that illustrated in Fig. 15;

Fig. 19 is a cross sectional elevation through line 19—19 of Fig. 18;

Fig. 20 is a cross sectional elevation through line 20—20 of Fig. 18;

Fig. 21 is a fragmentary side elevation of an assembled strip comprising the upper and lower portions illustrated in Figs. 15, 18;

Fig. 22 is a cross sectional elevation through line 22—22 of Fig. 21;

Fig. 23 is a cross sectional elevation through line 23—23 of Fig. 21;

Fig. 24 is a fragmentary side elevation of a type of strip similar to that illustrated in Fig. 8, in which the anchoring means formed in each one of its portions, are alternately extending to one or the other side of the strip;

Fig. 25 is a cross sectional elevation through line 25—25 of Fig. 24;

Fig. 26 is a cross sectional elevation through line 26—26 of Fig. 24;

Fig. 27 is a fragmentary side elevation of a strip similar to that shown in Fig. 21, illustrating a somewhat different type of interlocking joint;

Fig. 28 is a cross sectional elevation through line 28—28 of Fig. 27;

Fig. 29 is a cross sectional elevation through line 29—29 of Fig. 27;

Fig. 30 is a fragmentary side elevation of a strip similar to that shown in Fig. 21, illustrating the possibility of using an upper portion having a wider section than the rib portion of the strip;

Fig. 31 is a cross sectional elevation through line 31—31 of Fig. 30.

Fig. 32 is a cross sectional elevation through line 32—32 of Fig. 30;

Fig. 33 is a fragmentary side elevation of a strip composed of an upper portion similar to that used in the strip of Fig. 30 and a lower portion similar to that used in the strip of Fig. 24;

Fig. 34 is a cross sectional elevation through line 34—34 of Fig. 33; and

Fig. 35 is a cross sectional elevation through line 35—35 of Fig. 33.

Referring to Fig. 1 it will be observed that the terrazzo floor 40 represented thereby is composed of a number of panels 41, delimited by dividing strips 42, set in a predetermined arrangement, difining the general design of the floor.

The main characteristic of the strip forming the object of this invention is that the same is composed of two parts securely interlocking with each other; the upper part being made of a suitable metal such as brass, for instance, selected for its decorative and wearing qualities, and the lower part being made of another metal such as mild steel, for instance, selected for economy and strength.

A typical embodiment of my invention is shown in Figs. 2 to 11, illustrating the strip composed of an upper or head portion 43 and a lower or rib portion 44.

The upper or head portion which is in the form of a relatively narrow strip, is cut at spaced intervals along its lower edge, to form dove tailed notches 45, extending upwardly from the lower edge. In forming said notches the material is only cut along the downwardly converging sides 46, 47, of each notch, and the portion thus isolated from the body of the strip is bent rearwardly to form laterally projecting lugs 48, as shown.

By virtue of this construction, the lower edge of the head portion or strip remains formed in an alternate succession of dovetailed notches and dove tailed tenons or male elements of a dove tailed joint.

The lower or rib portion of the strip is also in the form of an elementary strip preferably somewhat wider than the upper portion, and its upper edge is notched to interlock with the lower edge of the upper portion. Said upper edge is accordingly cut at spaced intervals to correspond with the spacing between tenons 49 of the upper strip so as to form dovetailed notches 50 adapted to tightly fit and receive tenons 49.

Like in the previous case, in producing said notches, the material is only cut along the upwardly converging sides 51, 52, of each notch, and the portion of material thus isolated from the body of the strip is bent frontwardly to form laterally projecting lugs 53.

By virtue of this construction, the resulting tenons 54 are adapted to fit and to tightly interlock with notches 45 of the upper portion, so that the two elementary strips may be securely interlocked with one another, forming a composite strip such as shown in Figs. 8, 9, 10, 11.

The interlocking joint thus provided between the two elementary strips forming the composite strip can be made positively secure, by making the width of the notches a trifle smaller than the width of the corresponding tenons. This difference in width should only be at most, two of three thousandths of an inch, and will thus insure an extremely tight fit between the interlocking parts, such that the two parts cannot again become easily separated, once they have been forced together by the application of pressure.

The resulting structure, is to all intents and purposes as rigid as if it were formed out of a solid strip of material; furthermore, the same results formed with laterally projecting ears or lugs 48, 53, which provide suitable anchoring means for the strip, without weakening its sections. The lower anchoring means 53 are preferably used also as positioning means, determining the depth at which the lower part of the strip may be inserted through the foundation bed of the flooring; and to this end, the parts are so proportioned that the distance between the under surface of ears or lugs 53 and the upper edge 55 of the completed strip will be equivalent to the depth of the finishing layer of the floor.

This feature is illustrated in Fig. 12, where 56 designates the lower layer or bed of the floor, laid on the floor foundation 57, and 58 designates the upper or finishing layer of the floor. This figure illustrates a strip of the type just described, having its lower or rib portion 59, embedded within the lower layer of the floor, up to a point where the lower surface of its lugs or ears 23 rests against the upper surface of said lower layer. When the strip is so laid, the portion of the strip projecting above said surface acts as a gauge determining the thickness or depth of the upper or finishing layer, and the ears or lugs 53 act as supporting means for the strip insuring its vertical alignment.

At the same time, ears or lugs 48, projecting above and at the opposite side of the strip provide additional anchoring means between the strip and the material out of which the finishing layer is formed, further insuring the stability of the strip and the bond between the strip and the plastic material of the floor.

By virtue of the construction just described therefore, it is obvious that I obtain several important advantages over strips heretofore in use for similar purposes. In fact, I produce a strip which possesses all the rigidity of a solid strip from which no anchoring means have been punched and bent and at the same time, I also provide the anchoring and positioning means which are a necessary feature of this type of material.

Furthermore, I produce a strip which is cheaper than a strip of equivalent thickness, and width, made entirely of brass, by making the lower part of the strip out of relatively inexpensive material, and by doing this, I gain the further advantage of actually increasing the strength and rigidity of the structure, due to the fact that the steel used for the lower portion is stronger and more rigid than brass.

It is also possible if desired to make a composite strip with perfectly straight sides by blanking out the notches outright both in the upper and the lower portions of the strip. This construction is illustrated in Figs. 13, 14, where 60 designates the upper portion of the strip, 61 of the lower portion, 62 the dove tailed notches provided by a blanking operation through the lower edge of the upper portion 60, 63 the tenons or male portions resulting thereby, intervening between adjoining notches; 64 designates the dove tailed notches blanked off the upper edge of the lower portion of the strip, adapted to register with and to receive tenons 63, and 65 designates the tenons produced between adjoining notches 64, said tenons being adapted to register and to interlock with notches 62, as shown.

Also in this case, it is preferable that a tight fit be provided between the interlocking portions and therefore it will be advisable in practice to make the width of the tenons a trifle larger than the width of the corresponding notches interlocking therewith.

This type of strip is preferable to the one previously described, in such cases where curves of relatively small radius have to be produced, because the strip if made of relatively light gauge metal is easily bent in small circles and other curved shapes, while the strip previously described, does not bend as easily on account of the longitudinal rigidity imparted to it by the staggered ears or lugs 48, 53.

In Figs. 15 to 23, I illustrate another strip which is a combination of the head portion used in the strip of Figs. 13, 14 and the rib portion of the strip illustrated in Figs. 2 to 11.

In said figures, 66 designates the upper or head portion, which is in the form of a flat relatively narrow elementary strip, having spaced dove tailed notches 67, along its lower edge, said notches being formed by blanking out the material outright. The blanking of these notches results in the formation of tenons 68, intervening between adjoining notches.

The lower or rib portion consists of an elementary strip 69 preferably wider than strip 66 and is notched and spaced at intervals to form notches 70 adapted to register with and to receive tenons 68, as previously explained. Notches 70 are formed by slitting the metal along the sides of the notches and by bending the portion of metal thus isolated, outwardly, so as to form laterally extending ears or lugs 71.

The function of these ears or lugs has been explained before, and the resulting composite strip, illustrated in Figs. 21 to 23 will have an upper or head portion free of lateral extensions, and a lower or rib portion formed with anchoring and positioning means 71 as shown.

The absence of the upper row of laterally extending lugs such as shown in Figs. 2 to 11, permits a certain amount of flexibility in this type of strip which can thus be bent around curves, but not around curves of as small a radius as in the case of the strip illustrated in Figs. 13, 14.

In Figs. 24 to 26, I illustrate a modification of the strip illustrated in Figs. 2 to 11, in which both the upper and the lower portion of the strip are provided with ears or lugs alternately extending in both directions.

In said figures, 72 designates the upper portion of the strip formed with dove tailed notches 73 along its lower edge, and tenons 74 and 75 designates the lower portion of the strip formed with notches 76 registering with and receiving tenons 74, and provided with tenons 77 registering with and adapted to be inserted through notches 73.

All the notches are in this case, formed by slitting the metal along their sides, and by bending laterally the isolated portions thus obtained, but as shown in the drawings, the ears or lugs 78, 79 of the upper portion of the strip are alternately bent to one side and then to the other and in a similar manner ears or lugs 80, 81, of the lower portion of the strip are also bent to one side and then to the other in alternative succession.

This type of strip is substantially equivalent to that illustrated in Figs. 2 to 11, except that the action of its positioning means is somewhat more effective in maintaining the strip vertical, when the floor is being laid, because the total width of the supporting surface thus obtained is twice as large as in the case of the strip of Figs. 2 to 11.

In Figs. 27 to 29, I illustrate a modification of the strip shown in Figs. 21 to 23. This strip is also composed of an upper portion 82, provided with blanked out notches 83, and the lower portion 84 provided with tenons or male members 85, adapted to interlock with said notches, said tenons being obtained by slitting the metal about their sides and bending outwardly the metal portion thus isolated to form laterally extending ears or lugs 56.

However, the interlocking joint in this case, instead of being composed of dove tailed members is composed of male and female elements adapted to interlock with one another, but having some other shape adapted to exert an equivalent action. For instance, the male members 85 of the lower portion 84 have a rounded shape, and notches 83 are shaped accordingly. This example merely serves to illustrate the fact that for the purposes of my invention, it is immaterial what shape is used for the interlocking members of the upper and lower portions of the strip, as long as they are capable of producing an effective interlocking action.

This will be obtained as stated, by providing a tight fit for the interlocking members by any desired method, for instance, by allowing a few thousandths of an inch of difference between the width of the male and female elements as previously suggested.

My improved construction also lends itself advantageously to the construction of a strip composed of members of different thicknesses. This is an especially valuable feature when designs with abnormally heavy lines have to be produced. In such cases, it is customary to employ heavy gauge brass bars or strips, the cost of which goes to appreciably increase the total cost of the floor.

By virtue of my construction, I can use a relatively heavy gauge strip for the upper portion, blanking out the necessary notches along its lower edge, and a relatively light gauge strip for the lower portion, the light gauge material of which said lower portion is composed permitting of easily offsetting the required anchoring and positioning means.

Furthermore, the rib portion may be made of relatively inexpensive metal, such as cold rolled or hot rolled steel for instance, further decreasing the cost of production and incidentally, adding to the strength and rigidity of the structure.

In Figs. 30 to 32, I illustrate a strip where the upper portion 87 consists of a relatively heavy gauge narrow strip provided with spaced dove tailed notches 88 along its lower edge, said notches being obtained by blanking out the material at such point.

The lower or rib portion of the strip is similar to that illustrated in Figs. 18 to 23, being formed with notches 89, adapted to interlock with tenons 90 of upper portion 87, and with tenons 91 adapted to interlock with notches 88, the material isolated by slitting the sides of notches 89 being bent outwardly to form laterally extending ears or lugs 92. The rib portion of the strip may be inserted midway of the thickness of the upper portion, or else it may have one of its side surfaces flush with one of the side surfaces of the upper portion of the strip as shown.

In Figs. 33 to 35, I show another possible modification of the arrangement just described, where the upper portion 93 is similar in every respect to the one just described, and the lower portion 94 is also similar to the one described in connection with Figs. 30 to 32, except that its anchoring and positioning ears or lugs 95, 96, are alternately bent in one and then in the other direction, providing a better supporting surface for the strip as a whole, and also providing a better supporting surface for the upper portion of the strip.

In connection with the constructions of Figs. 30 to 32, and Figs. 33 to 35, it will be observed that the interlocking action between the two members may be made more positive if the lugs or ears are turned laterally but not quite to reach a horizontal position until the two members are connected together.

In this manner, the lugs or ears will press against the under surface of the upper portion of the strip, and their spring action will intensify the binding action of the interlocking joint. In the case of the strips previously described, where the two strip elements are of the same thickness, the action of the interlocking joint may also be supplemented if desired, by positive means, for instance, by spot welding or other methods of joining metal parts to one another.

For the purposes of my invention, it is not absolutely necessary that the anchoring means be formed by bending the material along the longitudinal side of some or all of the notches, since it is quite feasible to bend the material at some other point of the periphery of the notches or to provide anchoring means obtained by slitting and bending the material at points independent of the notches, as will be understood.

Therefore, since it is obvious that my inventive idea may be applied in ways different from those shown, the drawings should be understood as being intended for illustrative purposes only and not in a limiting sense.

I accordingly reserve myself the right to carry my invention into practice, in all those ways and manners which may enter, fairly, into the scope of the appended claims.

I claim:

1. A floor strip of the character described, comprising an upper and a lower longitudinal metal section interlocking with each other along their inner edges, said edges being formed with longitudinally interextending male and female joint members.

2. A floor strip of the character described, comprising an upper and a lower longitudinal metal section interlocking with each other along their inner edges, said edges being formed with interlocking notches and tenons, one of said sections being formed with anchoring means outwardly projecting from the base of said notches.

3. A floor strip of the character described, comprising an upper and a lower longitudinal metal section interlocking with each other along their inner edges, said edges being formed with interlocking notches and tenons, one of said sections being formed with anchoring means outwardly projecting from the base of said notches, said anchoring means also acting as positioning means determining the depth at which the strip is to be placed in position.

4. A floor strip of the character described, comprising an upper and a lower longitudinal metal section interlocking with each other along their inner edges, said edges being formed with male and female joints comprising interlocking notches and tenons, the lower section being formed with anchoring means outwardly projecting from the base of said notches, said anchoring means also acting as positioning means determining the depth at which the strip is to be placed in position.

5. A floor strip of the character described, comprising an upper and a lower longitudinal metal section interlocking with each other along their inner edges, each section having portions extending within the other, the thickness of one section being different from that of the other, said sections being made of two different metals.

6. A floor strip of the character described, comprising an upper and a lower longitudinal metal section interlocking with each other along their inner edges, said edges being formed with male and female joints comprising interlocking notches and tenons, the thickness of the upper section being greater than the thickness of the lower section.

7. A floor strip of the character described, comprising an upper and a lower longitudinal metal section interlocking with each other along their inner edges, said edges being formed with male and female joints comprising interlocking notches and tenons, the thickness of the upper section being greater than the thickness of the lower section, said lower section being formed with anchoring means outwardly projecting from the base of said notches.

8. A floor strip of the character described, comprising an upper and a lower longitudinal metal section interlocking with each other along their inner edges, said edges being formed with male and female joints comprising interlocking notches and tenons, the thickness of the upper section being greater than the thickness of the lower section, said lower section being formed with anchoring and positioning means outwardly projecting from the base of said notches.

9. A floor strip of the character described, comprising an upper and a lower longitudinal metal section interlocking with each other along their inner edges, said edges being formed with longitudinally interextending male and female joints comprising interlocking notches and tenons, said tenons fitting within said notches with a tight fit requiring the application of pressure in order to join the two sections together.

10. A floor strip of the character described, comprising an upper and a lower longitudinal metal section interlocking with each other along their inner edges, said edges being formed with longitudinally interextending male and female joints comprising interlocking notches and tenons, said tenons fitting within said notches with a tight fit requiring the application of pressure in order to join the two sections together, one of said sections being formed with anchoring means outwardly projecting from the base of said notches.

11. A floor strip of the character described, comprising an upper and a lower longitudinal metal section interlocking with each other along their inner edges, said edges being formed with longitudinally interextending male and female joints, comprising interlocking notches and tenons, one of said sections being formed with anchoring means outwardly projecting from the base of said notches, some of said anchoring means projecting at one side and some at the opposite side of said strip.

12. A floor strip of the character described, comprising an upper and a lower longitudinal section interlocking with each other along their inner edges, said edges being formed with longitudinally interextending male and female members, and anchoring means therefor, outwardly projecting from said strip.

13. A floor strip of the character described, comprising an upper and a lower longitudinal section interlocking with each other along their inner edges, said edges being formed with longitudinally interextending male and female joint members, and anchoring means therefor, outwardly projecting from said strip, said anchoring means also acting as positioning means determining the depth at which the strip is to be placed in position.

14. A floor strip of the character described, comprising an upper and a lower longitudinal section interlocking with each other along their inner edges, said sections being made of two different metals.

15. A floor strip of the character described, comprising an upper brass, and a lower steel longitudinal section interlocking with each other along their inner edges to form a single structure.

16. A floor strip of the character described, comprising an upper brass, and a lower steel longitudinal section interlocking with each other along their inner edges to form a single structure, and anchoring means outwardly projecting from said lower section.

17. A floor strip of the character described, comprising an upper and a lower longitudinal section, each section consisting of a single thickness of metal, said sections being permanently connected to each other along their inner edges, said sections being made of two different metals.

18. A floor strip of the character described, comprising an upper brass, and a lower steel longitudinal section, each section consisting of a single thickness of metal, said sections being permanently connected to each other along their inner edges to form a single structure.

19. A floor strip of the character described, comprising an upper brass, and a lower steel longitudinal section, each section consisting of a single thickness of metal, said sections being permanently connected to each other along their inner edges to form a single structure, and anchoring means outwardly projecting from said lower section.

PASQUALE GALASSI.